United States Patent [19]

Hibi

[11] Patent Number: 5,175,685
[45] Date of Patent: Dec. 29, 1992

[54] FEEDBACK RATIO CHANGE CONTROL FOR TRANSMISSION

[75] Inventor: Toshifumi Hibi, Yokohama, Japan

[73] Assignee: Nissan Motor Co., Ltd., Yokohama, Japan

[21] Appl. No.: 558,333

[22] Filed: Jul. 27, 1990

[30] Foreign Application Priority Data

Jul. 28, 1989 [JP] Japan .................................. 1-193886

[51] Int. Cl.$^5$ ...................... B60K 41/04; B60K 41/06; B60K 41/12
[52] U.S. Cl. .................................. 364/424.1; 74/866
[58] Field of Search ............... 364/424.1; 74/866, 867, 74/868; 474/11, 12, 18

[56] References Cited

U.S. PATENT DOCUMENTS

| 4,682,518 | 7/1987 | Takada et al. | 74/867 |
| 4,803,899 | 2/1989 | Kumura | 74/866 |
| 4,829,433 | 5/1989 | Nakano et al. | 364/424.1 |
| 4,846,019 | 7/1989 | Kumura | 74/864 |
| 4,853,857 | 8/1989 | Oshiage et al. | 364/424.1 |
| 4,967,621 | 11/1990 | Soga et al. | 74/867 |
| 5,021,031 | 6/1991 | Hibi | 474/18 |

FOREIGN PATENT DOCUMENTS 58-156764 9/1983 Japan .

Primary Examiner—Parshotam S. Lall
Assistant Examiner—Collin W. Park
Attorney, Agent, or Firm—Foley & Lardner

[57] ABSTRACT

A ratio change control for a transmission, in which an increase in feedback control term is restrained when a gearing mechanism takes over a drive between an input shaft, and an output shaft or when a transition in drive from the gearing mechanism to a continuously variable transmission mechanism has not been completed. Specifically, the feedback control term is set to zero.

14 Claims, 13 Drawing Sheets

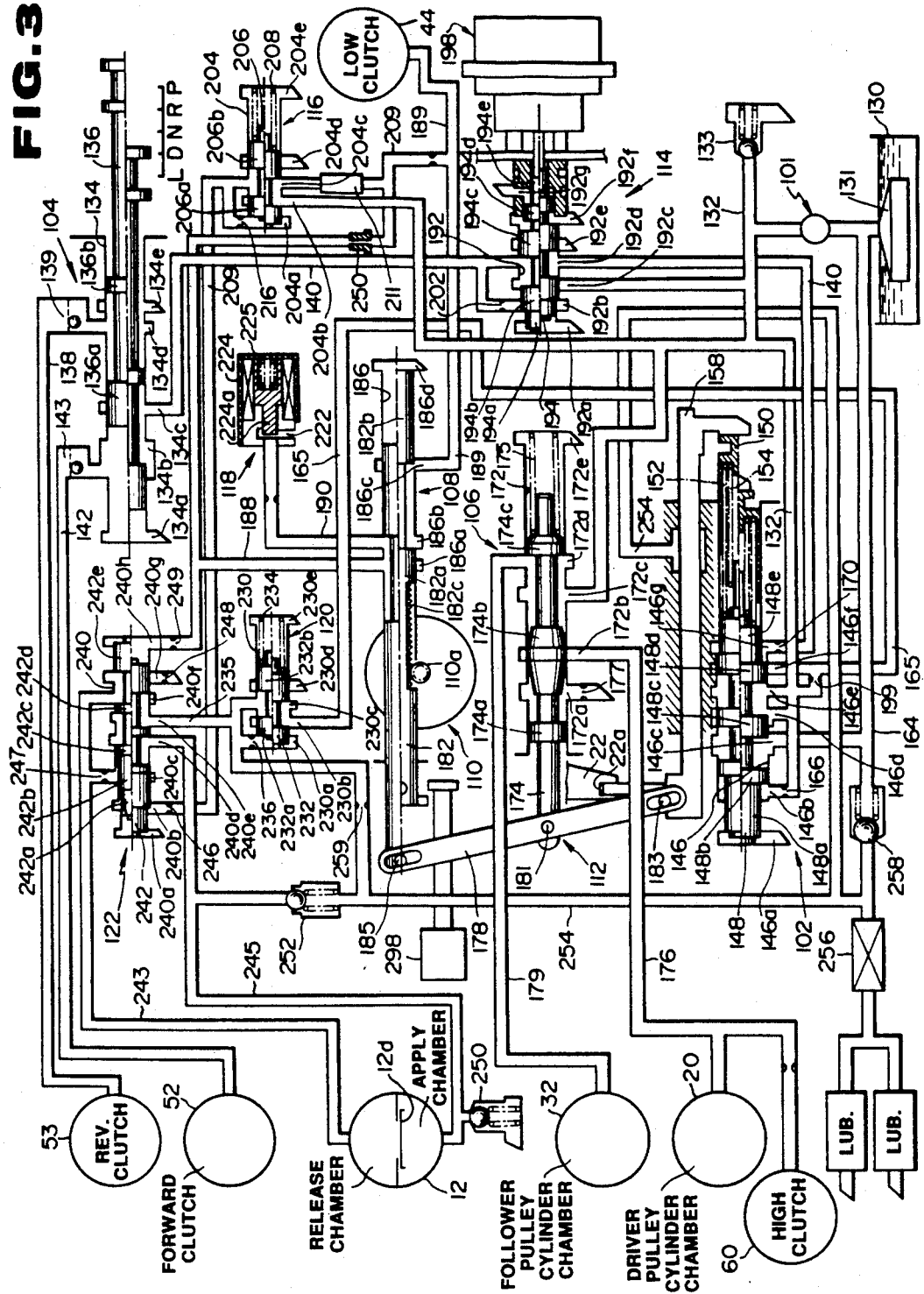

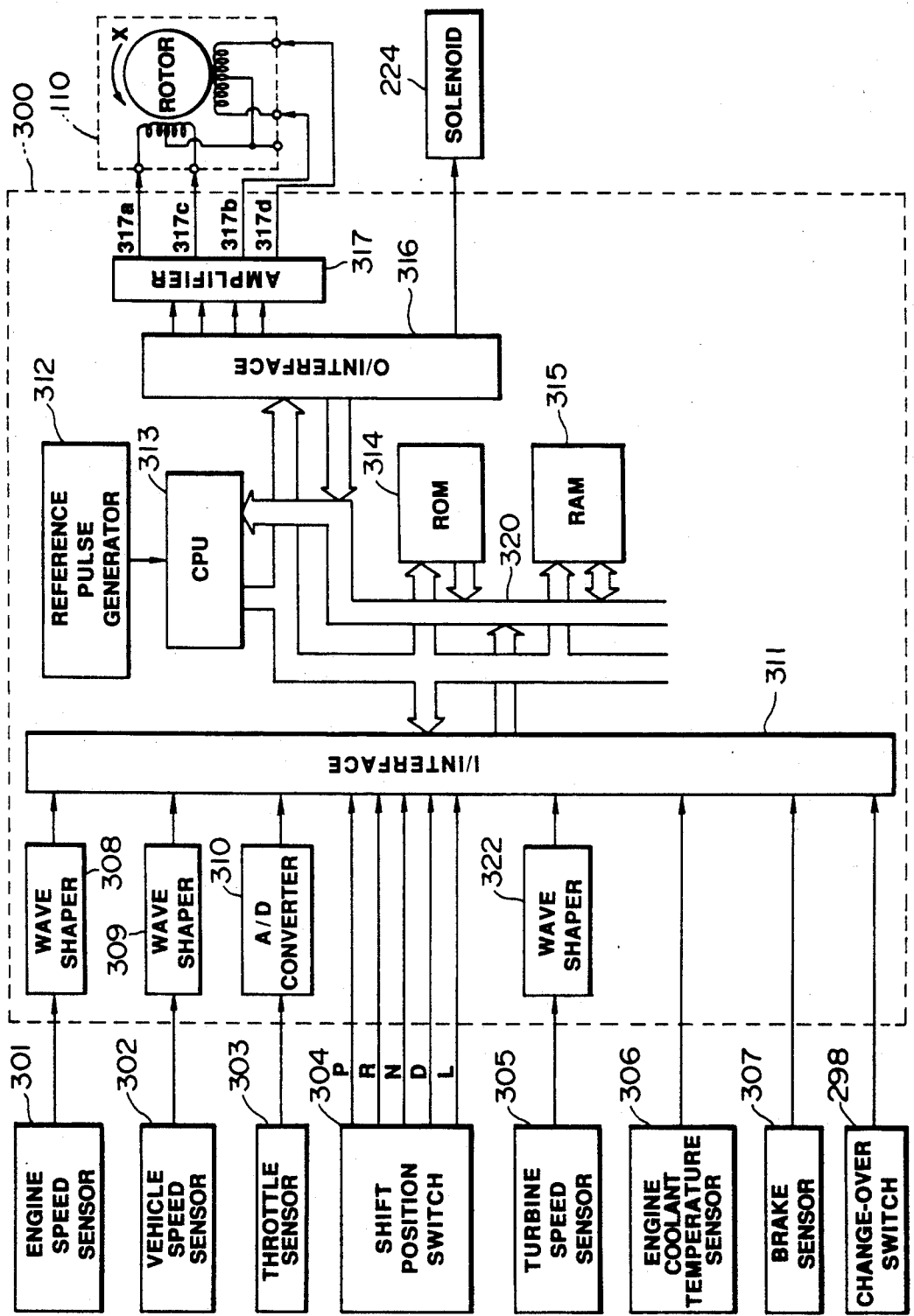

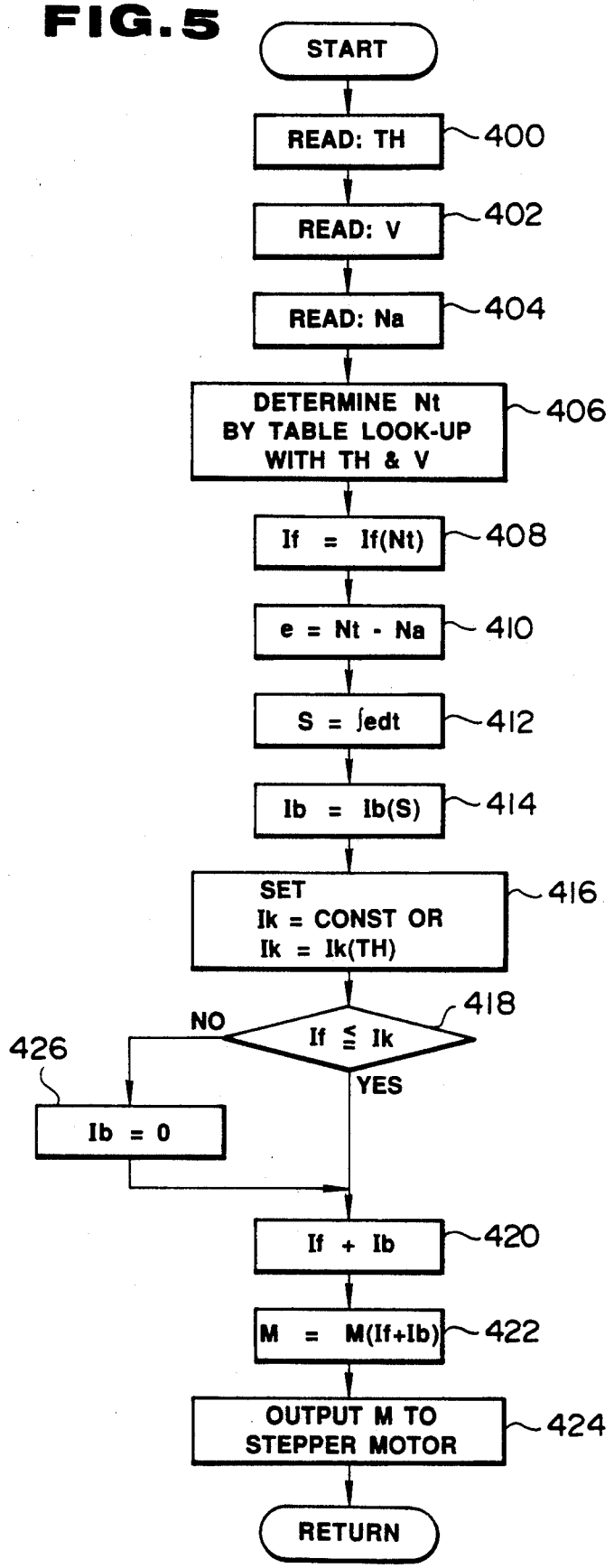

FEEDBACK RATIO CHANGE CONTROL FOR TRANSMISSION

RELATED APPLICATIONS AND PATENTS

U.S. patent application Ser. No. 07/278,887, filed Dec. 2, 1988 by Wataru ISHIMARU for a V-belt type continuously variable transmission (now U.S. Pat. No. 4,907,471 issued on Mar. 13, 1990). This Application corresponds to European Patent Application No. 88 120 186.7

U.S. Pat. No. 4,955,260, filed on Mar. 31, 1989 for Toshikazu OSHIDARI for a hydraulic control system for a transmission.

U.S. patent application Ser. No. 07/330,918, filed on Mar. 31, 1989 by Keiju ABO et al. for a control system for a transmission (now U.S. Pat. No. 4,895,552 issued on Jan. 23, 1990). This Application corresponds to European Patent Application No. 89 105 734.1.

U.S. patent application Ser. No. 07/336,422, filed on Apr. 11, 1989 by Toshikazu OSHIDARI for a line pressure control for a V-belt type continuously variable transmission.

U.S. patent application Ser. No. 07/348,837, filed on May 8, 1989 by Wataru ISHIMARU for a system for controlling hydraulic fluid pressure for a V-belt type automatic transmission.

U.S. patent application Ser. No. 07/489,058, filed on Mar. 7, 1990 by Toshifumi HIBI for a control system for transmission. This application corresponds to European Patent Application No. 90104376.0.

U.S. Pat. No. 5,021,031, claiming priority on Japanese Patent Application No. 1-192566.

BACKGROUND OF THE INVENTION

The present invention relates to a ratio change control for a transmission, and more particularly to a ratio change control for a hybrid continuously variable transmission including a gearing mechanism and a continuously variable transmission mechanism which are selectively rendered operabble to take over a drive from a transmission input shaft to a transmission output shaft.

U.S. Pat. No. 4,735,113 discloses a V-belt type continuously variable transmission including a driver pulley, a follower pulley, and a V-belt drivingly interconnecting these pulleys. Laid-open Japanese Patent Application No. 63-176862 and U.S. Pat. No. 4,907,471 disclose a hybrid continuously variable transmission in which the above-mentioned continuously variable transmission mechanism is combined with a gearing mechanism such that the gearing mechanism is put into operation to provide a reduction ratio between a transmission input shaft and a transmission output shaft for start-up operation. The setting is such that this reduction ratio provided by the gearing mechanism is larger than the maximum or largest reduction ratio provided by the continuously variable transmission mechanism. For high speed operation where a relatively small drive force is required, the continuously variable transmission mechanism is put into operation to take over the drive from the transmission input shaft to the transmission output shaft owing to engagement of a power interruption device, such as a clutch.

Referring to FIG. 9, consider the case where the control strategy shown in U.S. Pat. No. 4,735,113 is applied to the hybrid continuously variable transmission of the type mentioned above. FIG. 9 is a graph wherein a line G shows target driver pulley revolution speed values versus varying vehicle speed values when a gearing mechanism is put into operation to take over a drive. In FIG. 9, line L shows target driver pulley revolution speed values versus vehicle speed values when a continuously variable transmission mechanism provides its maximum or largest reduction ratio, while line S shows target driver pulley revolution speed values versus vehicle speed values when the continuously variable transmission mechanism provides its minimum or smallest reduction ratio. Let it be assumed that a vehicle starts moving with a ⅜ throttle opening degree. In this case, the driver pulley revolution speed increases along the line G from a point O to a point A with the reduction ratio provided by the gearing mechanism. Upon arriving at point A, a transition is made from the drive owing to the gearing mechanism to a drive owing to the continuously variable transmission. This causes a drop in driver pulley revolution speed without any substantial change in vehicle speed, resulting in a transfer from the point A to a point B on the line L. Then, with the maximum reduction ratio provided by the continuously variable transmission mechanism, the vehicle increases its speed till a point C on the line L. As the vehicle increases its speed further from a vehicle speed value corresponding to the point C, the reduction ratio decreases continuously toward the minimum reduction ratio provided by the continuously variable transmission mechanism along an operation line I. According to this control strategy, the continuously variable transmission mechanism effects a ratio change from the maximum reduction ratio to a relatively smaller reduction ratio on a broken line M. since a target driver pulley revolution speed corresponding to the point C' is set if the vehicle speed increases to a vehicle speed value corresponding to the point C'. A problem arises if, during transition from the drive owing to the gearing mechanism to the drive owing to the continuously variable transmission mechanism, the vehicle speed increases beyond the vehicle speed value corresponding to the point C and the continuously variable transmission has shifted off the maximum reduction ratio thereof. The transition in drive takes a relatively long time, since there is a delay in the hydraulic system for activating a clutch contributing to this transition. In this case, the vehicle starts running through the drive owing to the continuously variable transmission mechanism with a reduction ratio smaller than the maximum reduction ratio thereof. This transition inherently causes a substantial shock, which causes an insufficient driving force and thus poor acceleration.

Another hybrid continuously variable transmission is known. This known hybrid continuously variable transmission has a gearing mechanism which provides a reduction ratio smaller than the minimum reduction ratio provided by a continuously variable transmission mechanism. Such a hybrid continuously variable transmission is disclosed in Laid-open Japanese Patent Application No. 58-156764. If the continuously variable transmission mechanism is controlled according to the above-mentioned control strategy, there occurs a case where the continuously variable transmission mechanism shifts down from the minimum reduction ratio thereof during a transition from a drive owing to the gearing mechanism to a drive owing to the continuously variable transmission mechanism. This causes a substantial increase in engine speed, inducing a substantial shock.

An object of the present invention is to provide a ratio change control for a transmission which assures smooth and shockless transition between a drive owing to a gearing mechanism and a drive owing to a continuously variable transmission mechanism.

More specifically, the present invention provides a ratio change control employing a control action including a feedback control term in addition to a feedforward control term.

SUMMARY OF THE INVENTION

According to one aspect of the present invention, there is provided a ratio change control for a transmission, the transmission including an input shaft, an output shaft, a gearing mechanism and a continuously variable transmission mechanism, the gearing mechanism and continuously variable transmission mechanism being operatively combined with each other such that they alternatively take over a drive between the input and output shafts, the ratio change control comprising:

means for determining an actual value of a predetermined operating variable related to a revolution speed of the input shaft and generating an actual value indicative signal indicative of said actual value detected;

a control unit including means for determining a target value of said predetermined operating variable and generating a target value indicative signal indicative of said target value determined.

means for calculating a deviation between said actual value indicative signal and said target value indicative signal and generating a deviation indicative signal indicative of said deviation calculated, means for calculating a feedback control term as a function of said deviation indicative signal and generating a feedback control term indicative signal indicative of said feedback control term calculated, and means for calculating a feedforward control term as a function of said target value indicative signal and generating a feedforward control term indicative signal indicative of said feedforward control term calculated; and means for controlling a change in reduction ratio in the continuously variable transmission in response to said feedback control term indicative signal and said feedforward control term indicative signal;

said control unit also including means for limiting an increase in said feedback control term during periods when the gearing mechanism takes over a drive between the input and output shafts and when a transition in drive from the gearing mechanism to the continuously variable transmission mechanism has not been completed yet.

According to another aspect of the present invention, there is provided a method of ratio change control for a transmission, the transmission including an input shaft, an output shaft, a gearing mechanism and a continuously variable transmission mechanism, the gearing mechanism and continuously variable transmission mechanism being operatively combined with each other such that they alternatively take over a drive between the input and output shafts, the method comprising the steps of:

determining an actual value of a predetermined operating variable related to a revolution speed of the input shaft and generating an actual value indicative signal indicative of said actual value detected;

determining a target value of said predetermined operating variable and generating a target value indicative signal indicative of said target value determined;

calculating a deviation between said actual value indicative signal and said target value indicative signal; and generating a deviation indicative signal indicative of said deviation calculated;

calculating a feedback control term as a function of said deviation indicative signal and generating a feedback control term indicative signal indicative of said feedback control term calculated;

calculating a feedforward control term as a function of said target value indicative signal and generating a feedforward control term indicative signal indicative of said feedforward control term calculated;

controlling a change in reduction ratio in the continuously variable transmission in response to said feedback control term indicative signal and said feedforward control term indicative signal;

controlling a transition in drive between the gearing mechanism and the continuously variable transmission mechanism; and limiting an increase in said feedback control term during periods when the gearing mechanism takes over a drive between the input and output shafts and when a transition in drive from the gearing mechanism to the continuously variable transmission mechanism has not been completed yet.

According to further aspect of the present invention, there is provided a method of ratio change control for a transmission, the transmission including an input shaft, an output shaft, a gearing mechanism and a continuously variable transmission mechanism, the gearing mechanism and continuously variable transmission mechanism being operatively combined with each other such that they alternatively take over a drive between the input and output shafts, the method comprising the steps of:

determining an actual value of a predetermined operating variable related to a revolution speed of the input shaft and generating an actual value indicative signal indicative of said actual value detected;

determining a target value of said predetermined operating variable and generating a target value indicative signal indicative of said target value determined;

calculating a deviation between said actual value indicative signal and said target value indicative signal and generating a deviation indicative signal indicative of said deviation calculated;

calculating a feedback control term as a function of said deviation indicative signal and generating a feedback control term indicative signal indicative of said feedback control term calculated;

calculating, as a feedforward control term, a target reduction ratio as a function of said target value indicative signal and generating a target reduction ratio indicative signal indicative of said target reduction ratio calculated;

controlling a change in reduction ratio in the continuously variable transmission in response to said feedback control term indicative signal and said feedforward control term indicative signal;

determining whether said target reduction ratio falls in a predetermined range of reduction ratios, and generating a determined result indicative signal when said target reduction ratio falls in said predetermined range of reduction ratios; and setting said feedback control term to zero in response to said determined result indicative signal.

According to still further aspects of the present invention, there is provided a method of a ratio change control for a transmission, the transmission including an input shaft, an output shaft, a gearing mechanism and a continuously variable transmission mechanism, the gearing mechanism and continuously variable transmission mechanism being operatively combined with each other such that they alternatively take over a drive between the input and output shafts, the method comprising the steps of:

determining an actual value of a predetermined operating variable related to a revolution speed of the input shaft and generating an actual value indicative signal indicative of said actual value detected;

determining a target value of said predetermined operating variable and generating a target value indicative signal indicative of said target value determined;

calculating a deviation between said actual value indicative signal and said target value indicative signal and generating a deviation indicative signal indicative of said deviation calculated;

calculating a feedback control term as a function of said deviation indicative signal and generating a feedback control term indicative signal indicative of said feedback control term calculated;

calculating, as a feedforward control term, a target reduction ratio as a function of said target value indicative signal and generating a target reduction ratio indicative signal indicative of said target reduction ratio calculated;

controlling a change in reduction ratio in the continuously variable transmission in response to said feedback control term indicative signal and said feedforward control term indicative signal;

calculating an actual reduction ratio based on said actual value indicative signal and generating an actual reduction ratio indicative signal indicative of said actual reduction ratio calculated;

determining whether said actual reduction ratio indicative signal falls in a predetermined range of reduction ratio, and generating a determined result indicative signal when said actual reduction ratio indicative signal falls within in said predetermined range of reduction ratio; and setting said feedback control term equal to zero in response to said determined result indicative signal.

BRIEF DESCRIPTION OF THE DRAWINGS

FIG. 3 is a hydraulic circuit of a control system for the hybrid transmission;

FIG. 4 is a block diagram of a control unit associated with sensors and a shift motor;

FIG. 5 is a flowchart of a program contained in the control unit;

DETAILED DESCRIPTION OF THE EMBODIMENT

Referring to the accompanying drawings, a plurality of preferred embodiments of a control system, according to the present invention, are described.

Figure 1:
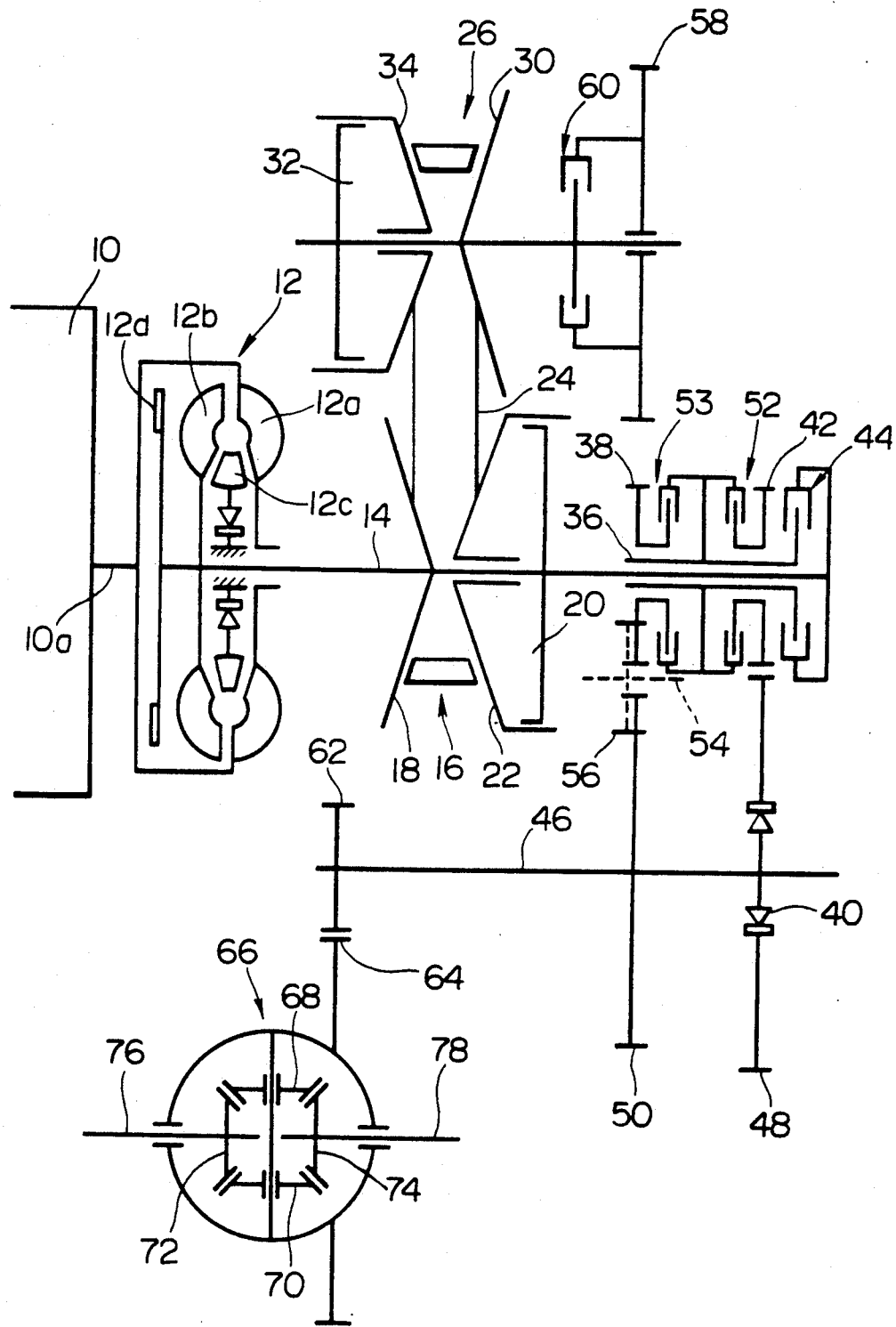
FIG. 1 is a schematic diagram of a hybrid transmission, including a gearing mechanism combined with a continuously variable transmission mechanism such that the gearing mechanism takes over a drive to provide a reduction ratio larger than the maximum reduction ratio provided by the continuously variable transmission mechanism.
Figure 2:
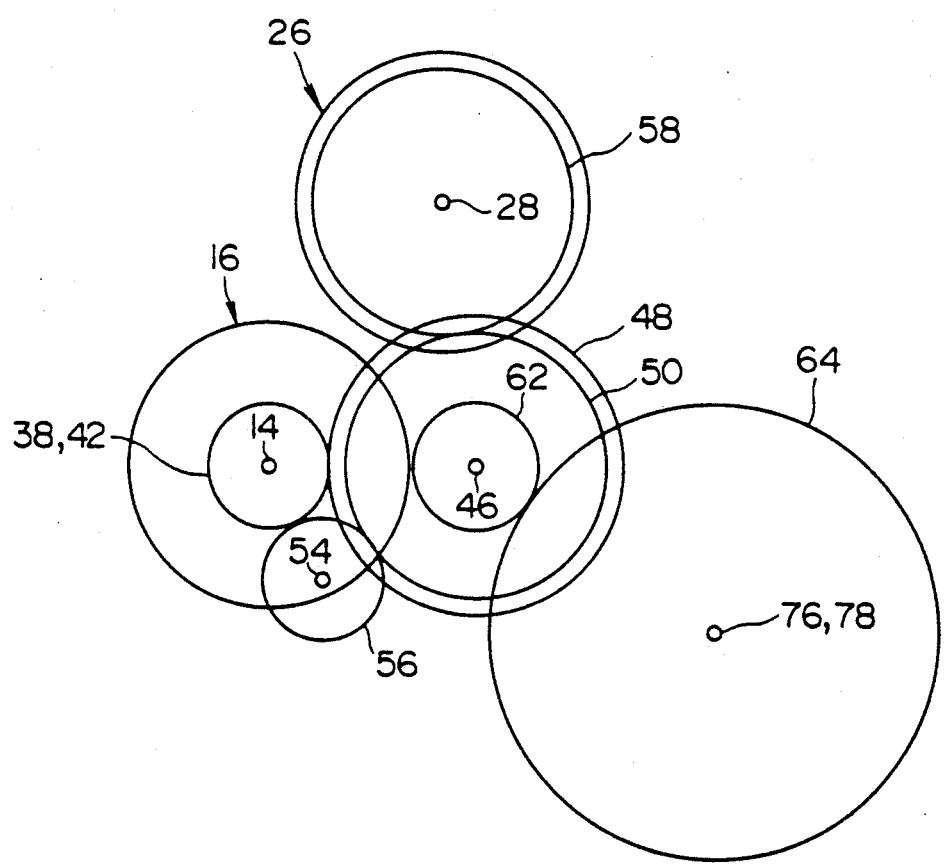
FIG. 2 is a diagram illustrating the arrangement of different transmission shafts.

Referring now to FIG. 1, a power train of a motor vehicle is described. In FIG. 1, an engine 10 is shown as having an output shaft 10a to which a torque converter 12 is coupled in the conventional manner. The torque converter 12 includes a pump impeller 12a, a turbine runner 12b and a stator 12c. It also includes a lock-up clutch 12d with which the pump impeller 12a and turbine runner 12b are selectively interconnected with. The turbine runner 12b of the torque converter 12 is drivingly connected to a turbine shaft or a driver shaft 14. On the driver shaft 14 is a driver pulley 16. The driver pulley 16 includes an axially stationary conical member 18 fixedly connected to the driver shaft 14, and an axially moveable conical member 22 connected to the driver shaft 14 in opposed spaced relationship with the stationary conical member 18. The conical members 18 and 22 define therebetween a V-shaped pulley groove. The driver pulley 16 includes a driver pulley cylinder chamber 20. The moveable conical member 22 is axially moveable toward the stationary conical member 18 in response to hydraulic pressure developed in the driver pulley cylinder chamber 20, causing the V-shaped pulley groove to decrease its width. The driver pulley 16 is drivingly connected via a V-belt 24 to a follower pulley 26. The follower pulley 26 includes an axially stationary conical member 30 fixedly connected to a follower shaft 28, and an axially moveable conical member 34 connected to the follower shaft 28 for axial movement. The conical members 30 and 34 define a V-shaped pulley groove therebetween. The follower pulley 26 includes a follower pulley cylinder chamber 32. The moveable conical member 34 is axially moveable toward the stationary conical member 30 in response to hydraulic pressure developed in the follower pulley cylinder chamber 32. The driver pulley 16, V- belt 24. and follower pulley 26 form a continuously variable transmission mechanism. The maximum reduction ratio provided by this continuously variable transmission mechanism is smaller than a reduction ratio provided by a gearing mechanism including a driver shaft side forward gear 42 and an output shaft side forward gear 48, which are described later. The driver shaft 14 extends through a hollow shaft 36. The hollow shaft 36 is rotatably supported on the driver shaft 14. Rotatably supported on the hollow shaft 36 are a reverse gear 38 and a forward gear 42. The forward gear 42 is connectable to the hollow shaft 36 by means of a hydraulic fluid operated forward clutch 52, while the reverse gear 38 is connectable to the hollow shaft 36 by means of hydraulic fluid operated reverse clutch 53. With a hydraulic fluid operated low clutch 44 engaged, the driver shaft 14 is connected to the hollow shaft 36. Extending in parallel to the driver shaft 14 is an output shaft 46. The forward gear 14 is mounted via a one-way clutch 40 to the output shaft 46, while a reverse gear 50 is mounted for unitary rotation with the output shaft 46. The forward gear 48 is in constant mesh with the forward gear 42. The reverse gear 50 is in constant mesh with a reverse idler gear 56, rotatable with an idler shaft 54. The reverse idler gear 56 is also in constant mesh with the reverse gear 38 too. In FIG. 1, since it is impossible to illustrate them in the cross sectional plane, the reverse idler shaft 54 and reverse idler gear 56 are illustrated by the broken line. Actually, they are arranged as illustrated in FIG. 2. In FIG. 1, the distance between the shafts and the diameter of each of the gears do not reflect the actual dimension. Thus, in order to know the actual relationship, reference should be made to FIG. 2.

The follower shaft 28 has a forward gear 58. Via a hydraulic fluid operated high clutch 60, the forward gear 58 is connectable to the follower shaft 28. As best seen in FIG. 2, the forward gear 58 is in constant mesh with the reverse gear 50. The forward gear 58 and reverse gear 50 have the same diameter. The output shaft 46 has a reduction gear 62 for rotation therewith. The reduction gear 62 is in constant mesh with a final gear 64 of a differential 66. The differential 66 includes a pair of pinion gears 68 and 70, which are rotatable with the final gear 64. A pair of side gears 72 and 74 mesh with the pinion gears 68 and 70. The side gears 72 and 74 are coupled with drive axles 76 and 78, respectively, for rotation therewith.

The neutral state is provided when the low clutch 44 and the high clutch 60 are both released. In this state, the transmission of rotational power from the driver shaft 14 to the output shaft 46 is interrupted.

On start-up or hill-climbing where a relatively large driving force is required, the forward clutch 52 is engaged and the low clutch 44 engaged. The high clutch 60 is released. In this state, the rotational power of the output shaft 10a of the engine 10 is transmitted via the torque converter 12 to the driver shaft 14, and further to the hollow shaft 36 via the engaged low clutch 44. The torque of the hollow shaft 36 is transmitted via the forward clutch 52 to the forward gear 42, and further to the forward gear 48 with which the gear 42 meshes with. Owing to the fact that the forward gear 48 is drivingly connected via the one-way clutch 40 to the output shaft 46, the rotational power is transmitted to the output shaft 46. Thereafter, the rotational power is transmitted via the reduction gear 62, and the final gear 64, to the differential 66 where it is distributed between the drive axles 76 and 78, causing the drive wheels of the vehicle, not illustrated, to rotate. During the transmission of rotational power mentioned above, the rotational power is not transmitted through the continuously variable transmission mechanism, but through the gearing mechanism. With the reduction ratio provided by the intermeshed forward gears 42 and 48, the rotational power is transmitted to the output shaft 46, thus providing a relatively large driving force.

When the operating condition progresses and now demands less driving force, the high clutch 60 is engaged with the above described state maintained. This causes the rotational power to be transmitted through the continuously variable transmission. The rotational power of the driver shaft 14 is transmitted, via the V-belt 24 and the follower pulley 26, to the follower shaft 28, and further to the forward gear 58 via the high clutch 60 that is engaged. Since the forward clutch 58 meshes with the reverse gear 50, the rotational power is transmitted to the output shaft 46, and further to the drive axles 76 and 78 via the same power delivery path as previously described. In this case, the output shaft 46 rotates at a higher speed than the forward gear 48 does, and thus the one-way clutch 40 idles. This allows the low clutch 44 to be kept engaged. In the manner as described above, the rotational power is transmitted through the continuously variable transmission mechanism. Thus, the reduction ratio can be varied continuously by varying the width of the V-groove of the driver pulley 26 which in turn induces variation in the width of the V-shaped groove of the follower pulley 26.

For reverse drive, the reverse clutch 53 is engaged, the low clutch 44 is engaged, and the high clutch 60 is released. The engagement of the reverse clutch 53 causes the reverse gear 38 to be connected to the hollow shaft 36 for unitary rotation. In this state, the rotational power of the driver shaft 14 is transmitted via the low clutch 44, the hollow shaft 36, the reverse clutch 53, the reverse gear 38, the reverse idler gear 56 and the reverse gear 50 to the output shaft 46. Since the reverse idler gear 56 is operatively disposed in the power delivery path, the direction of rotation of the output shaft 46 is opposite the direction of rotation of the output shaft 46. Thus, the vehicle can move in the reverse direction.

A hydraulic control system for the hybrid continuously variable transmission is now described. As shown in FIG. 3, the control system comprises an oil pump 101, a line pressure regulator valve 102, a manual valve 104, a shift control valve 105, a direction control valve 108 (which may be called a shift command valve) for controlling the direction of adjustment pressure within a hydraulic fluid line 190, a shift operating mechanism 112, a throttle valve 114, a constant pressure regulating valve 116, a solenoid valve 118, a torque converter pressure regulating valve 120, and a lock-up control valve 122.

The shift control valve 106 has a valve bore 172 provided with five ports 172a, 172b, 172c, 172d and 172e, a spool 174 having three axially spaced lands 174a, 174b, and 174c slidably fit in the valve bore 172, and a spring 175 biasing the spool 174 to the left as viewed in FIG. 3. The port 172b communicates via a hydraulic fluid conduit 176 with the driver pulley cylinder chamber 20, and this conduit 176 communicates with the high clutch 60 at its servo chamber. The port 172a and the port 172e are drain ports, respectively. An orifice 177 is provided at the drain port 172a. The port 172d communicates via a hydraulic fluid conduit 179 with the follower pulley cylinder chamber 32. The port 172c communicates with a hydraulic fluid conduit 132 that serves as a line pressure circuit and, thus, is supplied with the line pressure. The spool 174 has a lefthand end, as viewed in FIG. 3, rotatably linked via a pin 181 to a middle portion of a lever 178 of the shift operating mechanism 112, later described in detail. The land 174b has an axial section with a curved contour. This allows a portion of hydraulic fluid supplied from the line pressure port 172c to flow into the port 172a. Thus, the pressure at the port 172b is determined by a ratio of the amount of hydraulic fluid flowing from the port 172c toward the port 172b to the amount of hydraulic fluid discharged out of the drain port 172a. If the spool 174 moves to the left as viewed in FIG. 3, this leftward movement of the spool 174 causes the degree of opening of a clearance on the line pressure side of the port 172b to increase, and the degree of opening of a clearance on the discharge side of the port 172b to decrease. This results in an increase in pressure at the port 172b. The port 172d is always supplied with the line pressure from the port 172c. The hydraulic presure developed at the port 172b is supplied via the conduit 176 to the driver pulley cylinder chamber 20, while the hydraulic pressure developed at the port 172d is supplied to the follower pulley cylinder chamber 32.

Therefore, leftward movement of the spool 174, as viewed in FIG. 3, causes an increase in the hydraulic pressure developed in the driver pulley cylinder chamber 20, resulting in a decrease in the width of the V-shaped pulley groove of the driver pulley 16. This also results in an increase in the width of the V-shaped pulley groove of the follower pulley 26, since the V-belt 26 is wedged into the V-shaped groove of the follower pulley 26. Therefore, the reduction ratio becomes small since the radius of the running diameter of the V-belt on the driver pulley 16 increases, but the radius of the running diameter of the V-belt 24 on the follower pulley 26 decreases. The reduction ratio becomes large when the spool 174 is urged to move to the right as viewed in FIG. 3.

The lever 178 of the shift operating mechanism 112 has its middle portion linked via a pin 181 to the spool 174 of the shift control valve 106. The lever 178 has one or lower end, as viewed in FIG. 3, linked via a pin 183 to a reduction ratio transmission member 158 and the opposite or an upper end linked via a pin 185 to the rod 182 of the direction control valve 108. The rod 182 is formed with a rack 182c with which a pinion gear 110a of a shift motor 110 in the form of a stepper motor meshes.

According to this shift operating mechanism 112, rotating the pinion gear 110a of the shift motor 110 in such a direction as to displace the rod 182 to the right, as viewed in FIG. 3, causes the lever 178 to swing clockwise about the pin 183. This clockwise movement of the lever 178 causes the spool 174 of the shift control valve 106 to move to the right, as viewed in FIG. 3. The rightward movement of the spool 174 of the shift control valve 106 causes a reduction in hydraulic pressure within the driver pulley chamber 20, causing the axially moveable conical member 22 of the driver pulley 16 in such a direction as to increase the width of the V-shaped pulley groove. Viewed in FIG. 3, the conical member 22 moves to the left. Since the end of the lever 178 is connected via the pin 183 to the reduction ratio transmission member 158, this leftward movement of the conical member 22, as viewed in FIG. 3, causes the lever 178 to swing clockwise about the pin 185. This clockwise movement of the lever 178 displaces the spool 174 to the left, as viewed in FIG. 3, causing an increase in hydraulic pressure within the driver pulley chamber 20, thus causing the reduction ratio to become small. As a result, the driver pulley 16 and the follower pulley 26 assume one of stable states, providing one reduction ratio. Each stable state corresponds to one rotary position which the shift motor 110 takes. If the shift motor 110 rotates in the opposite or reverse direction, the above-mentioned process progresses. The rod 182 is moveable to the right, as viewed in FIG. 3, beyond a position at which the maximum and largest reduction ratio is induced toward an overstroke position. When the rod 182 has moved toward and stayed at the overstroke position, a change-over switch 298 is activated. The output signal of this switch 298 is fed to a control unit. It will now be recognized that when the shift motor 110 is operated in a predetermined shift pattern, the variation of the reduction ratio follows this pattern. Therefore, the variation in reduction ratio in the continuously variable transmission mechanism is controlled by controlling the shift motor 110.

The rotary position which the shift motor 110 takes is determined by a number of pulses supplied to the shift motor 110 by a control unit 300 shown in FIG. 4. The control unit 300 stores a plurality of shift patterns and generates the number of pulses in accordance with one shift pattern selected out of all.

The direction control valve 108 includes a valve bore 186 provided with ports 186a, 186b, 186c and 186d, and a rod 182 with lands 182a and 182b received in the valve bore 186. The port 186a communicates with a hydraulic fluid conduit 188. The port 186b communicates via a hydraulic fluid conduit 190 with the solenoid valve 118. The port 186c communicates with a hydraulic fluid conduit 189. The port 186d is a drain port. Normally, the ports 186a and 186b communicate with each other via a space defined between the lands 182a and 182b. When the rod 182 moves beyond the position corresponding to the maximum reduction ratio toward the overstroke position, the port 186a is covered by the land 182a, while the port 186b is allowed to communicate with the port 186c. The above-mentioned hydraulic fluid conduit 189 communicates with the low clutch 44.

The other valves illustrated in FIG. 3 are substantially the same as their counterparts disclosed in JP 61-105351. The hydraulic circuit except the low clutch 44 and the high clutch 60 is substantially the same as a hydraulic control system disclosed in European Patent Application published under publication number 0180209 on May 7, 1986 or U.S. Pat. No. 4,735,113 issued to Yamamuro et al. on Apr. 5, 1988.

Referring to FIG. 4, the control unit 300 comprises an input interface 311, a reference pulse generator 312, a central processor unit (CPU) 313, a read only memory (ROM) 314, a random access memory (RAM) 315 and an output interface 316. They are operatively interconnected by an address bus 319 and a data bus 320. Output signals of an engine speed sensor 305, a vehicle speed sensor 302, a throttle sensor 303, a shift position switch 304, a turbine speed sensor 305, an engine coolant temperature sensor 306, a brake sensor 307, and a change-over switch 298. These output signals are supplied directly or indirectly via wave shapers 308, 309, and 322, and an A/D converter 310. Output signals of the control unit 300 are supplied via an amplifier and leads 317a, 317b, 317c and 317d to the shift motor 110. The solenoid 224 is also under the control of the control unit 300. For further understanding of the control unit 300, reference should be made to U.S. Pat. No. 4,735,113, mentioned before.

The operation of this embodiment is described. When the rotation of motor 110 toward the maximum and largest reduction ratio causes the rod 182 to move beyond the predetermined position corresponding to the maximum reduction ratio to the overstroke position, the direction control valve 108 takes a position as illustrated by the lower half thereof, viewed in FIG. 3. In this state of the direction control valve 108, the conduit 190 is allowed to communicate with the conduit 189, establishing a state where the hydraulic fluid pressure adjusted by the solenoid valve 118 is supplied to the low clutch 44. Thus, the torque capacity of the low clutch 44 becomes adjustable by the solenoid valve 118. Upon the direction control valve 108 staying in the overstroke position, the spool 174 of the shift control valve 106 which is linked via the lever 178 to the rod 182 is displaced to the right as viewed in FIG. 3 and, thus, the port 172b is allowed to communicate with the drain port 172a. Thus, the driver pulley cylinder chamber 20 and high clutch 60 are drained. As a result, the high clutch 60 is released with the low clutch 44 left engaged and thus the gearing mechanism takes over a drive between the driver shaft 14 and the output shaft 46. The torque is therefore multiplied at the reduction ratio determined by the forward gears 42 and 48.

When the operating condition progresses and demands a less driving force, the shift motor 110 rotates toward the minimum and smallest reduction ratio, the rod 182 moves toward the minimum reduction ratio beyond the predetermined position corresponding to the maximum reduction ratio. This movement of the rod 182 causes the lever 178 to displace the spool 174 to the left, as viewed in FIG. 3. This causes the land 174b of the spool 174 to close communication of the port 172b with the drain port 172a and open communication of the port 172b with the line pressure port 172c, allowing the supply of hydraulic fluid to the port 172b from the line pressure port 172c. Thus, the driver pulley cylinder chamber 20 is supplied with the hydraulic fluid pressure and the high clutch 60 is also supplied with the hydraulic fluid pressure and engaged. Engagement of the high clutch 60 causes a transition from a drive owing to the gearing mechanism to a drive owing to the continuously variable transmission mechanism. Upon completion of the transition, the continuously variable transmission takes over a drive between the shafts 14 and 46. Thereafter, the rotational power is transmitted by the continuously variable transmission mechanism and the reduction ratio is allowed to continuously vary. Under this operating condition, although the low clutch 40 is kept engaged, since the one-way clutch 40 idles, the rotational power is transmitted via the continuously variable transmission mechanism. The direction control valve 108 allows the conduit 188 to communicate with the conduit 190, rendering the solenoid valve 118 to control the lock-up control valve 122. Thus, the engagement of the lock-up clutch 12d is controlled by the solenoid valve 118. The valve 108 assumes the overstroke position when the spool 136 of the manual valve 104 is placed at P or R or N position. Since the valve 108 is in the overstroke position and the solenoid valve 118 drains the conduit 190 when the spool 136 of the manual valve 104 is placed at P or N position, no hydraulic fluid pressure is applied to the low clutch 44, leaving the same released.

Referring to the flowchart of FIG. 5, it is now explained how the control unit 300 operates during transition from the drive owing to the gearing mechanism to the drive owing to the continuously variable transmission mechanism. The ROM 314 of the control unit 300 stores a program as illustrated by the flowchart in FIG. 5.

In FIG. 5, at a step 400, a reading operation is performed, based on the output signal of the throttle sensor 303 to store the result as a throttle opening degree TH. At the subsequent step 402, a reading operation is performed, based on the output signal of the vehicle speed sensor 302 to store the result as a vehicle speed V. At a step 404, a reading operation is performed, based on the output signal of the turbine speed sensor 305 to store the result as an actual driver pulley revolution speed $N_a$. At a step 406, a table look-up operation of a shift point mapping data stored in the ROM 314 is performed, using the stored throttle opening degree TH and vehicle speed V in order to determine and store the result as a target driver pulley revolution speed $N_t$. At a step 408, using the data $N_t$ and V stored at steps 406 and 402, an equation $I_t = N_t/V$ is calculated to store the result as a feedforward reduction ratio $I_f$. At a step 410, the data $N_a$ is subtracted from the data $N_t$ to store the result as a deviation e. At a step 412, the integral of the deviation e is calculated to store the result as an intgral S. At a step 414, a feedback reduction ratio is calculated using the integral S as a variable to store the result as the feedback reduction ratio $I_b$. At a step 416, a constant is stored as a reference value $I_k$. At a comparison step 418, it is determined whether the feed forward reduction ratio $I_f$ is less than or equal to the reference value $I_k$. If the answer to the inquiry at the step 418 is YES, i.e., $I_f$ is less than or equal to $I_k$, the sum of $I_f$ and $I_b$ is calculated at a step 420. At a step 422, a number of steps along which a stepper motor drive signal should be moved is determined and the result is stored as a step number M. Then, at a step 424, the stepper motor drive signal is moved along the number of steps M. In this example, the reference value $I_k$ is set equal to a reduction ratio value less than and close to the maximum reduction ratio provided by the continuously variable transmission mechanism.

If the gearing mechanism still takes over a drive, or the transition in drive from the gearing mechanism to the continuously variable transmission mechanism has not been completed, the feedforward reduction ratio $I_f$ is still greater than the reference value $I_k$ and, thus, the answer to the inquiry at the step 418 is NO. In this case, the program proceeds from this step 418 to a step 426, wherein the feedback reduction ratio $I_b$ is set equal to zero and then to the step 420, 422 and 424. In this case, the feedback control is prohibited.

From the above explanation along with this flowchart, it will be appreciated that feedback control is prohibited if the gearing mechanism still takes over a drive or the transition in drive from the gearing mechanism to the continuously variable transmission mechanism has not been completed yet.

Figure 5A:
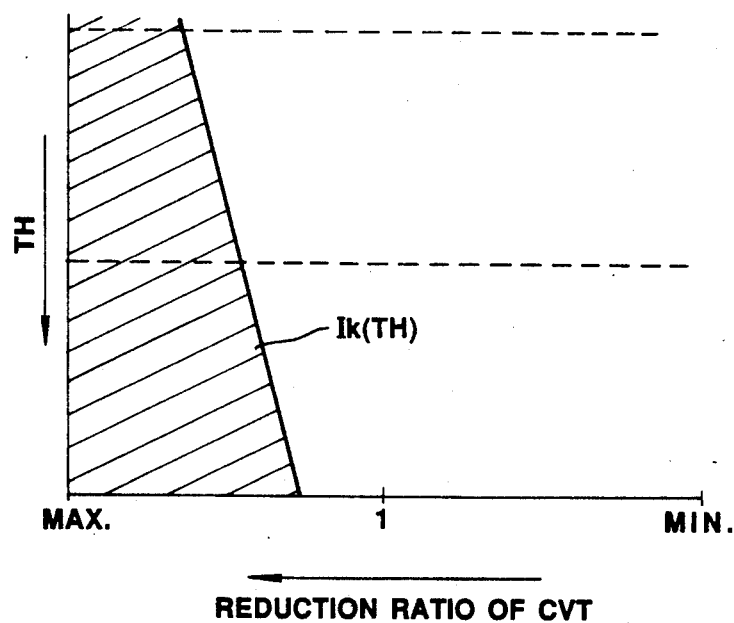
FIG. 5A is graphical representation of the function $I_k(TH)$.

A time period required from the instant when a command is issued to the instant when a transition in drive from the gearing mechanism to the continuously variable transmission mechanism is completed is not invariable but variable as a function of throttle opening degree TH. Thus, it is preferrable to set the reference value $I_k$ equal to a function $I_k(TH)$ as shown in FIG. 5A. Referring to FIG. 5A, a shadow region illustrates the region where feedback control is inhibited. It will now be appreciated that the region where the feedback control be prohibited extends toward the minimum reduction ratio as the throttle opening degree TH increases.

Figure 6:
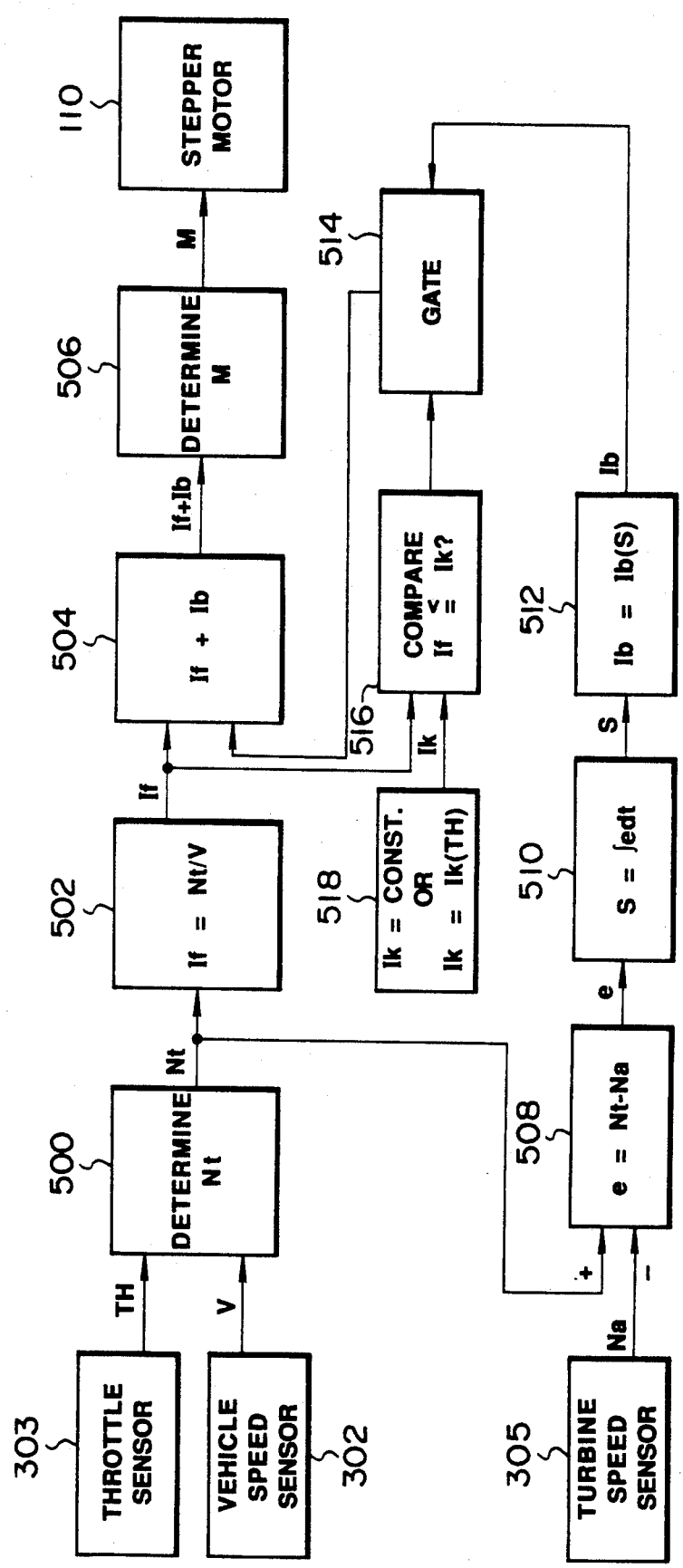
FIG. 6 is a functional block diagram.

Referring to FIG. 6, a control concept according to the present invention is described. For this control, the outputs of the throttle sensor 303 and vehicle speed sensor 302 are supplied to a functional block 500 where the target driver pulley revolution speed $N_t$ for a throttle opening degree TH indicated by the output of the throttle sensor 303 and a vehicle speed V indicated by the output of the vehicle speed sensor 302 is determined. The output $N_t$ of this block 500 is supplied to a block 502 where a feedforward reduction ratio $I_f$ is determined by calculating an equation $I_f = N_t/V$. The output $I_f$ is supplied to a block 504 where the feedforward reduction ratio $I_f$ is added to a feedback reduction ratio $I_b$. The sum of $I_f$ and $I_b$ is supplied to a block 506 where a stepper motor pulse number M is determined. The output of this block 506 is supplied to the shift motor 110.

The output $N_t$ of the block 500 and the output of the turbine revolution speed sensor 305 are supplied to a block 508. The output of the turbine revolution speed sensor 305 is indicative of a driver pulley revolution speed $N_a$. At the block 508, a deviation e between $N_t$ and $N_a$ is calculated. The output e of the block 508 is supplied to a block 510 where the integral S, with respect to time, of the deviation e is calculated. The output S of the block 510 is supplied to a block 512 where a feedback reduction ratio $I_b$ is calculated as a function of the integral S. The output $I_b$ of the block 512 is supplied via a gate 514 to the before mentioned block 504. The feedforward reduction ratio $I_f$ is supplied from the block 502 to a block, where $I_f$ is compared with a reference value $I_k$ supplied from a block 518. At the block 518, $I_k$ is set equal to a constant or a function $I_k(TH)$ (see FIG. 5A). At the block 516, it is determined whether $I_f$ is less than or equal to the reference value $I_k$. If the feedforward reduction ratio $I_f$ is still larger than the reference value $I_k$ and thus the transition from the drive owing to the gearing mechanism to the drive owing to the continuously variable transmission mechanism has not been completed yet, the gate 514 shifts in response to the output of the block 516 to a state where the feedback reduction ratio $I_b$ is set equal to zero. Thus, the feedback control is inhibited. Of course, if the feedforward reduction ratio $I_f$ becomes equal to or less than the reference value $I_k$, the gate 514 allows the passage of feedback reduction ratio $I_b$ to the block 504, thus allowing the feedback control to take effect.

Figure 7:
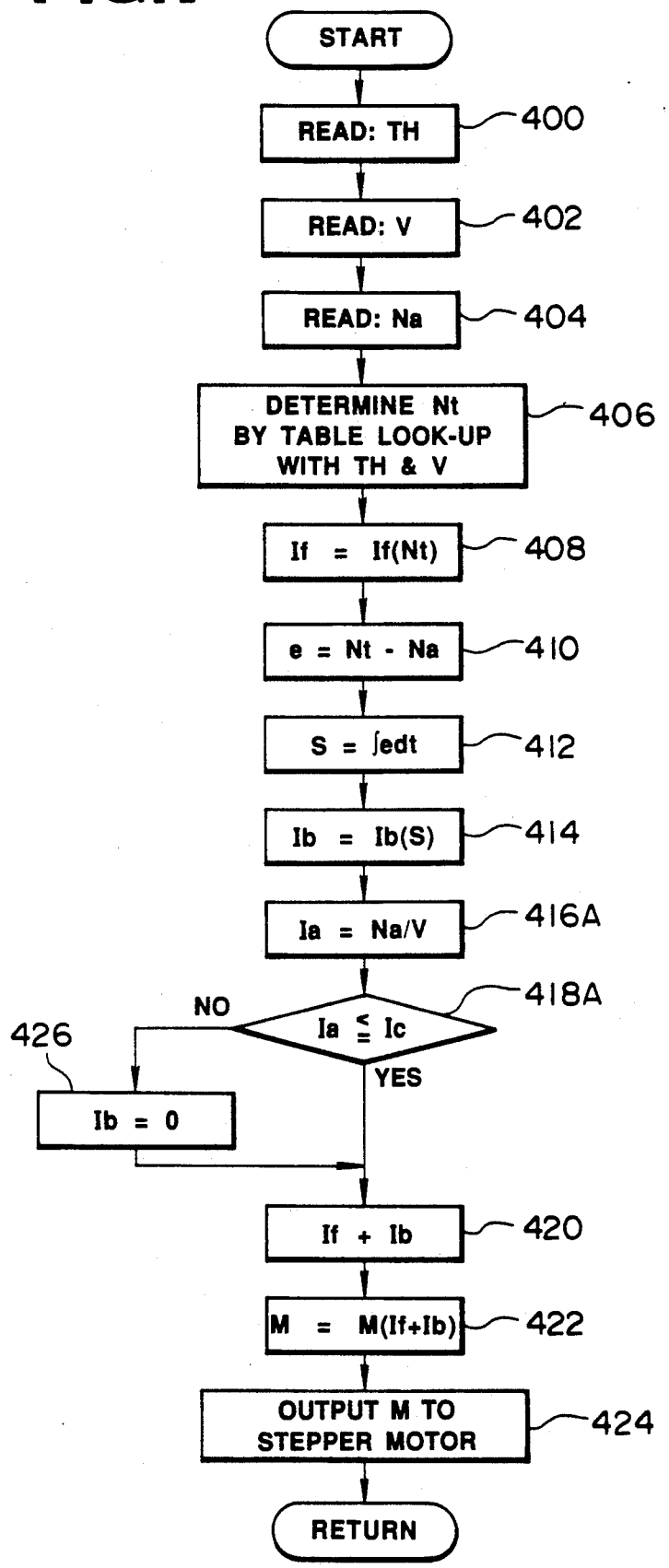
FIG. 7 is a flowchart similar to FIG. 5, showing a program used in another embodiment.

Referring to the flowchart shown in FIG. 7, another embodiment is described. This embodiment is substantially the same as the previously described embodiment except the fact the region where the feedback control is inhibited is defined by from comparing an actual reduction ratio $I_a$ with a reference value $I_c$ that corresponds to the maximum reduction ratio provided by the continuously variable transmission mechanism, instead of comparing the feedback reduction ratio $I_f$ with the reference value $I_k$.

Specifically, in FIG. 7, the program proceeds from a step 414 to a step 416A where an actual reduction ratio $I_a$ is calcualted using an equation $I_a = N_a/V$. Then, at a step 418A, it is determined whether the actual reduction ratio $I_a$ is less than or equal to a reference value $I_c$ corresponding to the maximum reduction ratio provided by the continuously variable transmission. If an answer to the inquiry is NO, the program proceeds to a step 426, while if the answer is YES, the program proceeds directly to a step 420.

Figure 8:
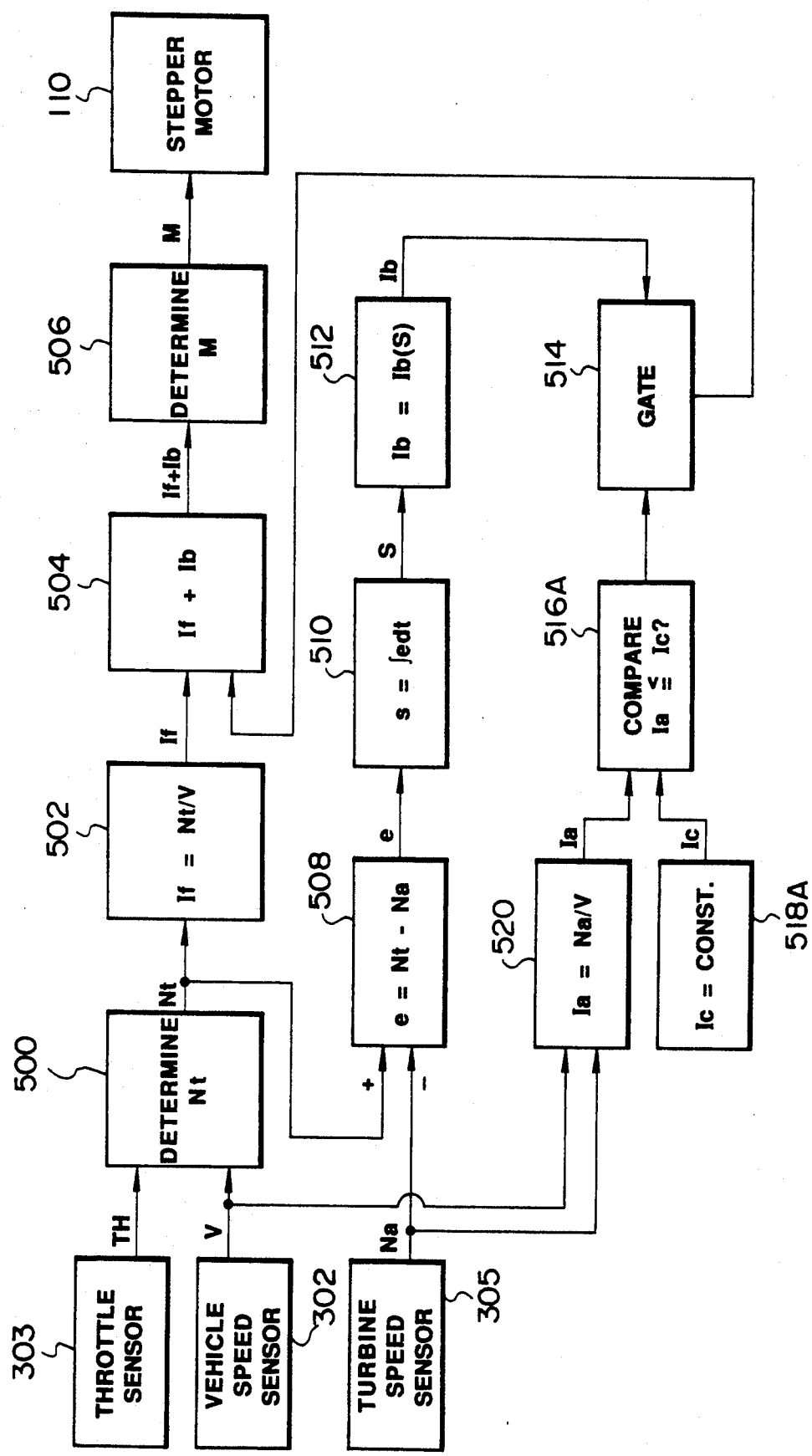
FIG. 8 is a functional block diagram for another embodiment.
Figure 9:
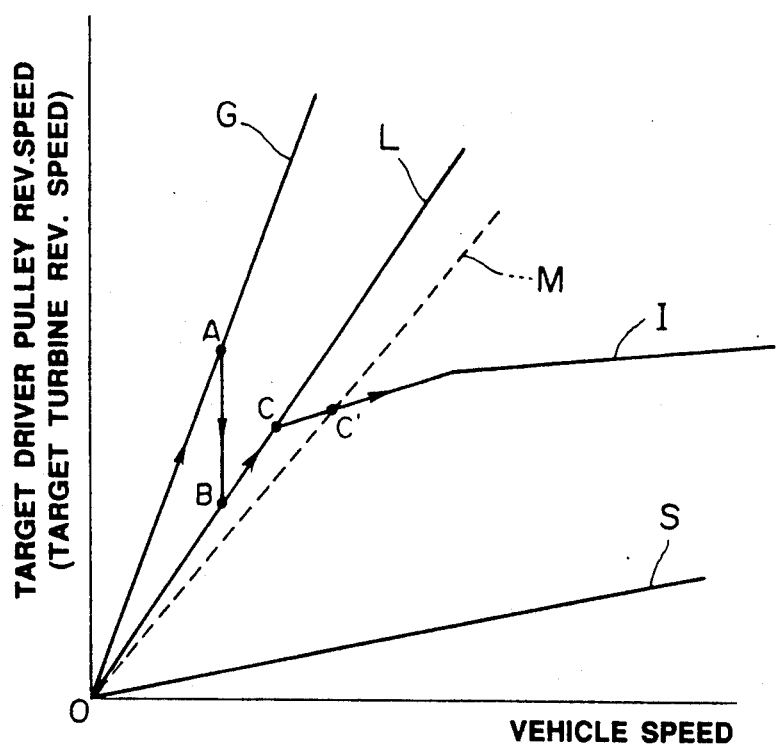
FIG. 9 a graphical representation of the control strategy discussed above.

FIG. 8 is a block diagram similar to FIG. 6 and illustrate a control concept of this embodiment. This block diagram is substantially the same as FIG. 6, except for the addition of block 520 and addition of blocks 518A and 516A in the place of the blocks 518 and 516.

According to this embodiment, the feedback control is inhibited until the transition in drive from the gearing mechanism to the continuously variable transmission mechanism is completed.

The present invention is applicable to a hybrid transmission including a gearing mechanism which is combined with a continuously variable transmission mechanism, such that the gearing mechanism takes over a drive to provide a reduction ratio smaller than the minimum reduction ratio provided by the continuously variable transmission mechanism. One example of such a hybrid transmission is illustrated in FIGS. 10 through 13.

Figure 10:
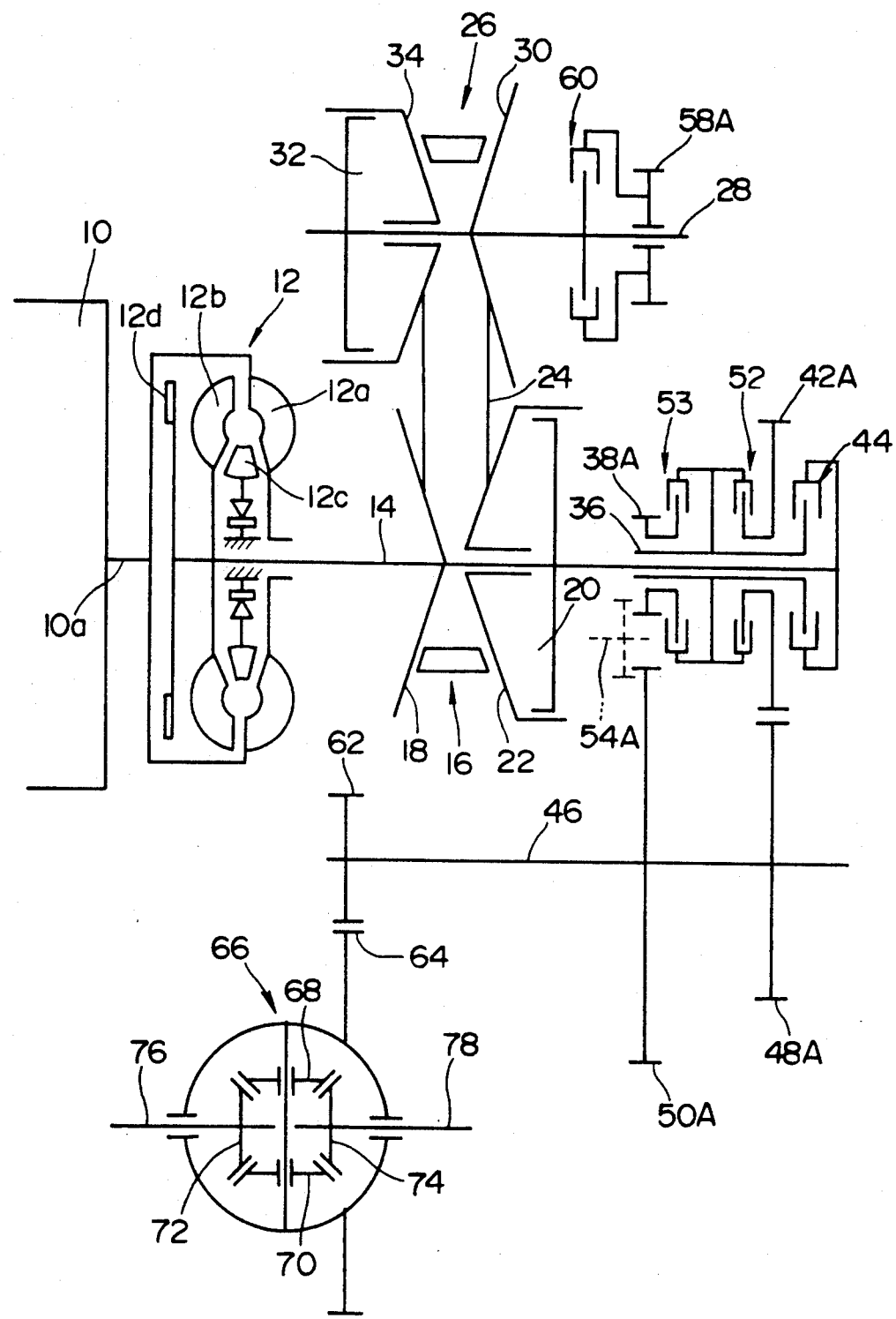
FIG. 10 is a view similar to FIG. 1, showing a hybrid transmission including a gearing mechanism combined with a continuously variable transmission such that the gearing mechanism takes over a drive to provide a reduction ratio smaller than the minimum reduction ratio provided by the continuously variable transmission.

The hybrid transmission shown in FIG. 10 is substantially the same as the previously described hybrid transmission shown in FIG. 1, except fact fact that the sizes of gears 58A, 50A, 42A, 48A, 38A, and 54A are different from their counterparts 58, 50, 42, 48, 38, and 54.

Figure 11:
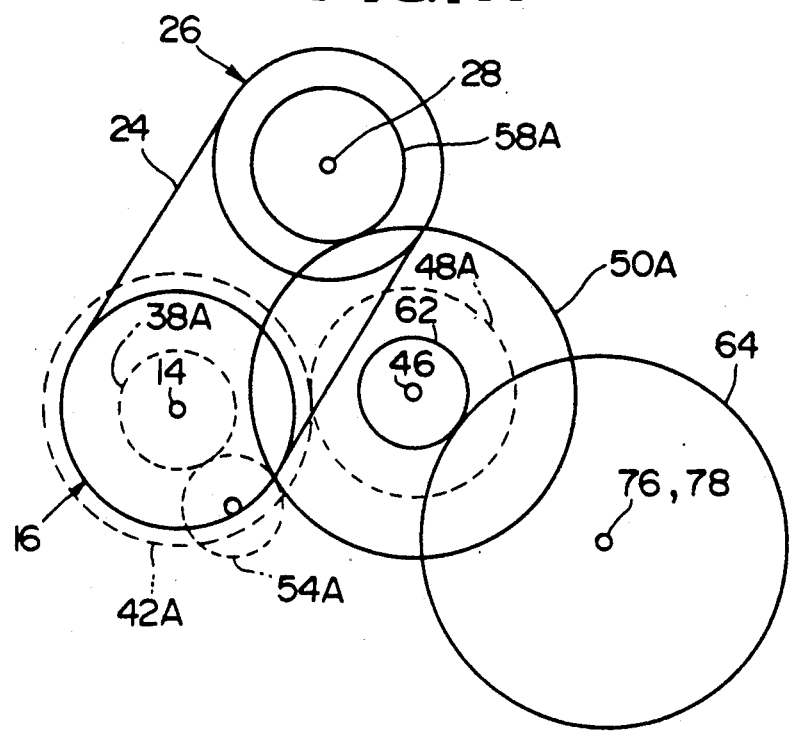
FIG. 11 is a view similar to FIG. 2, illustrating in fully drawn line rotary elements which play a role when the continuously variable transmission mechanism takes over a forward drive in the hybrid transmission shown in FIG. 10.

FIG. 11 illustrates in the fully drawn line that the pulley unit 16, 24, and 26 and the gears 58A, 50A, 62, and 64 play a role when the continuously variable transmission takes over a forward drive in the hybrid transmission shown in FIG. 10.

Figure 12:
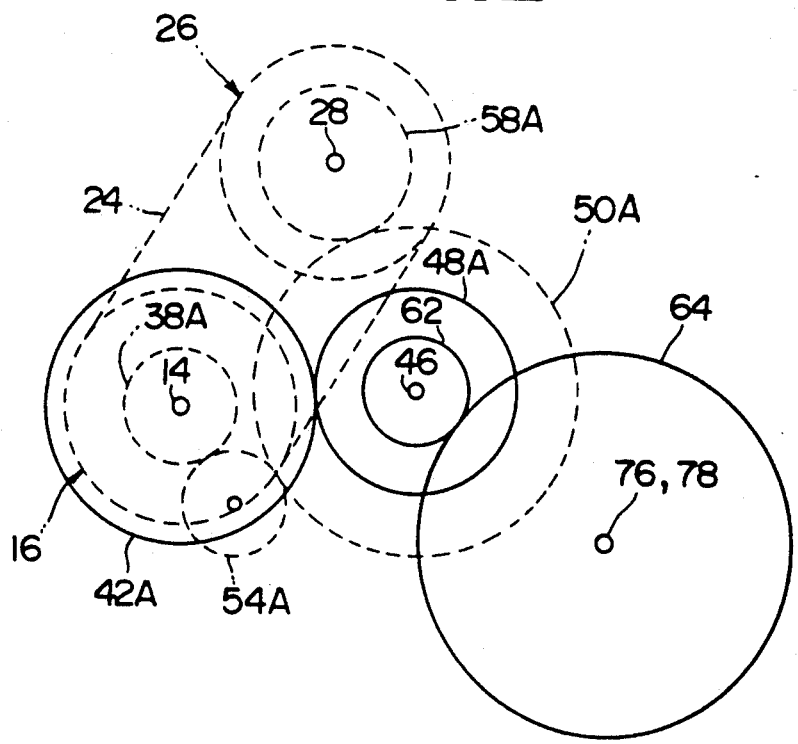
FIG. 12 is a view similar to FIG. 11, illustrating in fully drawn line rotary elements which play a role when the gearing mechanism takes over a forward drive in the hybrid transmission shown in FIG. 10.

FIG. 12 illustrates in the fully drawn line that the gears 42A, 48A, 62, and 64 play a role when the gearing mechanism takes over a forward drive in the hybrid transmission shown in FIG. 10. When it takes over the drive, the gearing mechanism provides a reduction ratio smaller than the minimum or smallest reduction ratio provided by the continuously variable transmission.

Figure 13:
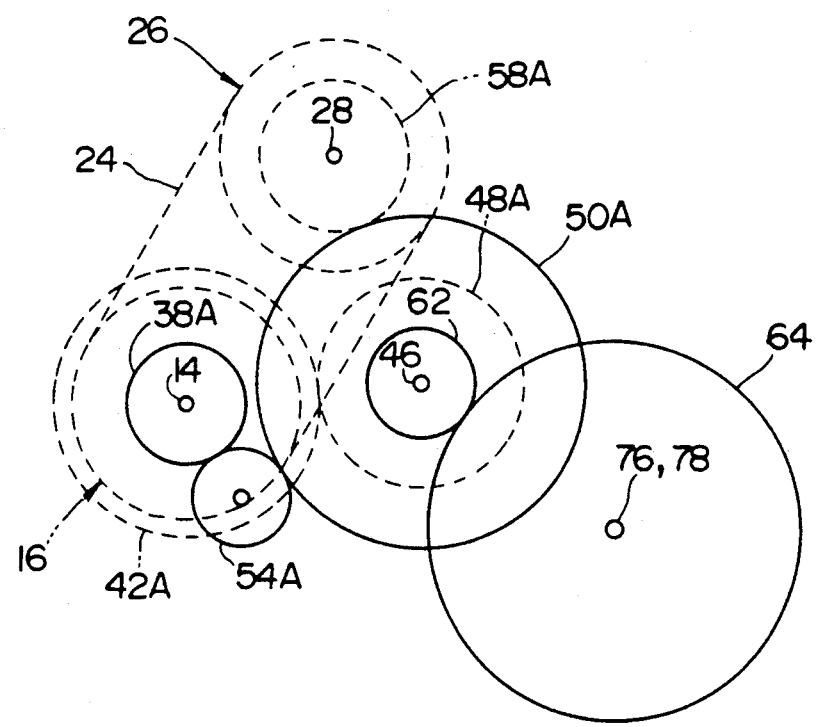
FIG. 13 is a similar view to FIG. 11 illustrating in fully drawn line rotary elements which play a role when the gearing mechanism takes over a reverse drive in the hybrid continuously variable transmission shown in FIG. 10.

FIG. 13 illustrates in the fully drawn line that the gears 38A, 54A, 50A, 62, and 64 play a role when the gearing mechanism takes over a reverse drive in the hybrid transmission shown in FIG. 10.

The present invention is embodied in this hybrid transmission such that the feedback control of the continuously variable transmission mechanism is prevented until a transition from the forward drive owing to the gearing mechanism to the drive owing to the continuously variable transmission mechanism is completed.

What is claimed is:

1. A ratio change control for a transmission, the transmission including an input shaft, an output shaft, a gearing mechanism and a continuously variable transmission mechanism, the gearing mechanism and the continuously variable transmission mechanism being operatively combined with each other such that they alternatively take over a drive between the input and output shafts, the ratio change control comprising:

means for determining an actual value of a predetermined operating variable related to a revolution speed of the input shaft and generating an actual value indicative signal indicative of said actual value detected;

a control unit including means for determining a target value of said predetermined operating variable and generating a target value indicative signal indicative of said target value determined, means for calculating a deviation between said actual value indicative signal and said target value indicative signal and generating a deviation indicative signal indicative of said deviation calculated, means for calculating a feedback control term as a function of said deviation indicative signal and generating a feedback control term indicative signal indicative of said feedback control term calculated, and means for calculating a feedforward control term as a function of said target value indicative signal and generating a feedforward control term indicative signal indicative of said feedforward control term calculated; and means for controlling a change in reduction ratio in the continuously variable transmission in response to said feedback control term indicative signal and said feedforward control term indicative signal, and for controlling a transition in drive between the gearing mechanism and the continuously variable transmission mechanism;

said control unit also including means for limiting an increase in said feedback control term during periods when the gearing mechanism takes over a drive between the input and output shafts and during periods when a transition in drive from the gearing mechanism to the continuously variable transmission mechanism has not been completed.

2. A ratio change control as claimed in claim 1, wherein said feedforward control term calculating means calculates, as said feedforward control term, a target reduction ratio based on said target value indicative signal, and said control unit includes means for determining whether said target reduction ratio falls in a predetermined range of reduction ratio or not and generating a determined result indicative signal when said target reduction ratio falls in said predetermined range in reduction ratio.

3. A ratio change control as claimed in claim 2, wherein said predetermined range of reduction ratio includes the maximum reduction ratio provided by the continuously variable transmission mechanism and the adjacent reduction ratios provided thereby.

4. A ratio change control as claimed in claim 2, wherein said restraining means includes means for setting said feedback control term equal to zero in response to said determined result indicative signal.

5. A ratio change control as claimed in claim 4, wherein said control unit includes means for determining a reference value which limits said predetermined range in reduction ratio.

6. A ratio change control as claimed in claim 5, including means for detecting a load on an engine associated with the transmission and generating a load indicative signal indicative of said load detected.

7. A ratio change control as claimed in claim 6, wherein said reference value determining means determines said reference value as a function of said load indicative signal.

8. A ratio change control as claimed in claim 7, wherein said load indicative signal is indicative of a throttle opening degree of the engine.

9. A ratio change control as claimed in claim 1, wherein said control unit includes means for calculating an actual reduction ratio based on said actual value indicative signal and generating an actual reduction ratio indicative signal, and means for determining whether said actual reduction ratio indicative signal falls in a predetermined range of reduction ratio or not and generating a determined result indicative signal when said actual reduction ratio indicative signal falls in said predetermined range of reduction ratio.

10. A ratio change control as claimed. in claim 9, wherein said predetermined range of reduction ratio is limited by the maximum reduction ratio provided by the continuously variable transmission mechanism and a one reduction ratio larger than said the maximum reduction ratio provided by the gearing mechanism.

11. A ratio change control as claimed in claim 10, wherein said restraining means includes means for setting said feedback control term equal to zero in response to said determined result indicative signal.

12. A method of a ratio change control for a transmission, the transmission including an input shaft, an output shaft, a gearing mechanism and a continuously variable transmission mechanism, the gearing mechanism and continuously variable transmission mechanism being operatively combined with each other such that they alternatively take over a drive between the input and output shafts, the method comprising the steps of:

determining an actual value of a predetermined operating variable related to a revolution speed of the input shaft and generating an actual value indicative signal indicative of said actual value detected;

determining a target value of said predetermined operating variable and generating a target value indicative signal indicative of said target value determined;

calculating a deviation between said actual value indicative signal and said target value indicative signal and generating a deviation indicative signal indicative of said deviation calculated;

calculating a feedback control term as a function of said deviation indicative signal and generating a feedback control term indicative signal indicative of said feedback control term calculated;

calculating a feedforward control term as a function of said target value indicative signal and generating a feedforward control term indicative signal indicative of said feedforward control term calculated;

controlling a change in reduction ratio in the continuously variable transmission in response to said feedback control term indicative signal and said feedforward control term indicative signal;

controlling a transition in drive between the gearing mechanism and the continuously variable transmission mechanism; and limiting an increase in said feedback control term during periods when the gearing mechanism takes over a drive between the input and output shafts and during periods when a transition in drive from the gearing mechanism to the continuously variable transmission mechanism has not been completed yet.

13. A method of a ratio change control for a transmission, the transmission including an input shaft, an output shaft, a gearing mechanism and a continuously variable transmission mechanism, the gearing mechanism and continuously variable transmission mechanism being operatively combined with each other such that they alternatively take over a drive between the input and output shafts, the method comprising the steps of:

determining an actual value of a predetermined operating variable related to a revolution speed of the input shaft and generating an actual value indicative signal indicative of said actual value detected;

determining a target value of said predetermined operating variable and generating a target value indicative signal indicative of said target value determined;

calculating a deviation between said actual value indicative signal and said target value indicative signal and generating a deviation indicative signal indicative of said deviation calculated;

calculating a feedback control term as a function of said deviation indicative signal and generating a feedback control term indicative signal indicative of said feedback control term calculated;

calculating, as a feedforward control term, a target reduction ratio as a function of said target value indicative signal and generating a target reduction ratio indicative signal indicative of said target reduction ratio calculated;

controlling a change in reduction ratio in the continuously variable transmission in response to said feedback control term indicative signal and said feedforward control term indicative signal;

determining whether said target reduction ratio falls in a predetermined range of reduction ratio or not and generating a determined result indicative signal when said target reduction ratio falls in said predetermined range of reduction ratio; and setting said feedback control term equal to zero in response to said determined result indicative signal.

14. A method of a ratio change control for a transmission, the transmission including an input shaft, an output shaft, a gearing mechanism and a continuously variable transmission mechanism, the gearing mechanism and continuously variable transmission mechanism being operatively combined with each other such that they alternatively take over a drive between the input and output shafts, the method comprising the steps of:

determining an actual value of a predetermined operating variable related to a revolution speed of the input shaft and generating an actual value indicative signal indicative of said actual value detected;

determining a target value of said predetermined operating variable and generating a target value indicative signal indicative of said target value determined;

calculating a deviation between said actual value indicative signal and said target value indicative signal and generating a deviation indicative signal indicative of said deviation calculated;

calculating a feedback control term as a function of said deviation indicative signal and generating a feedback control term indicative signal indicative of said feedback control term calculated;

calculating, as a feedforward control term, a target reduction ratio as a function of said target value indicative signal and generating a target reduction ratio indicative signal indicative of said target reduction ratio calculated;

controlling a change in reduction ratio in the continuously variable transmission in response to said feedback control term indicative signal and said feedforward control term indicative signal;

calculating an actual reduction ratio based on said actual value indicative signal and generating an actual reduction ratio indicative signal indicative of said actual reduction ratio calculated;

determining whether said actual reduction ratio indicative signal falls in a predetermined range of reduction ratio or not and generating a determined result indicative signal when said actual reduction ratio indicative signal falls in said predetermined range of reduction ratio; and setting said feedback control term equal to zero in response to said determined result indicative signal.

* * * * *